United States Patent [19]
Moore

[11] 4,080,142
[45] Mar. 21, 1978

[54] APPARATUS FOR REMOVING MANDRELS FROM TUBULAR ARTICLES

[75] Inventor: Michael O. Moore, Shawnee, Kans.

[73] Assignee: Certain-teed Corporation, Valley Forge, Pa.

[21] Appl. No.: 760,348

[22] Filed: Jan. 18, 1977

[51] Int. Cl.² .............................................. B29C 7/00
[52] U.S. Cl. .................................................... 425/438
[58] Field of Search ................................ 425/393, 438

[56] References Cited
U.S. PATENT DOCUMENTS

| | | | |
|---|---|---|---|
| 3,135,993 | 6/1964 | Ryan | 425/438 X |
| 3,591,896 | 7/1971 | Tartoglia | 425/393 X |
| 4,008,028 | 2/1977 | Rorden et al. | 425/393 X |

*Primary Examiner*—J. Howard Flint, Jr.
*Attorney, Agent, or Firm*—Paul & Paul

[57] ABSTRACT

An apparatus for automatically removing a mandrel from a tubular article which utilizes a positioning and stopping means to rearrange the position and retain the tubular article after it has been formed. After the tubular article has been stopped a gripping and moving means operate to automatically remove the mandrel from the tubular article and return the mandrel to a storage area.

13 Claims, 7 Drawing Figures

APPARATUS FOR REMOVING MANDRELS FROM TUBULAR ARTICLES

BACKGROUND OF THE INVENTION

This invention relates to the manufacture of tubular articles and more particularly with an apparatus for removing mandrels from tubular articles.

Tubular articles are generally formed by having material wrapped around a mandrel. A mandrel is a cylindrical axle that serves as a core around which material is wrapped and formed. The mandrel forms the inner dimensions of the item and must be removed after the forming operation is completed.

It is the usual practice in the manufacturing of coverings for pipes to wrap the mat of intermixed fibers and uncured binder into a mandrel, then confine the wrapped mat and mandrel within a hollow mold conforming in shape and dimension with the desired outside configuaation of the article to be produced. Sufficient heat is then applied to the confined object to cure the binder material thereby molding and setting the product into its final shape. After the article has been cured it is necessary to remove the mandrel from the article and to return the mandrel to a storage area from which it can be easily retrieved and used again.

Many devices have been used with varying degrees of success to automatically remove mandrels from cured tubular articles. However, these devices have proved both expensive to manufacture and to operate. It has also been found that these devices are not as efficient as they should be in effectuating a quick removal of the mandrel from the article. Further, few of the present mandrel removing devices are completely automatic.

OBJECTS AND SUMMARY OF THE PRESENT INVENTION

It is therefore, the object of the present invention to provide an apparatus for automatically removing mandrels from tubular articles.

Another object of the present invention is to provide an apparatus for transferring the removed mandrel to a particular storage or wrapping area.

A further object of the present invention is to provide a method and apparatus for automatically and simultaneously removing the mandrels from a pair of tubular articles and returning the removed mandrels to a storage or wrapping area.

These and other objects and advantages of this invention will become apparent to those skilled in the art after a consideration of the following detailed description, taken in conjunction with the accompanying drawings in which the preferred form of this invention is illustrated.

DETAILED DESCRIPTION OF THE PREFERRED EMBODIMENT

Figure 1:
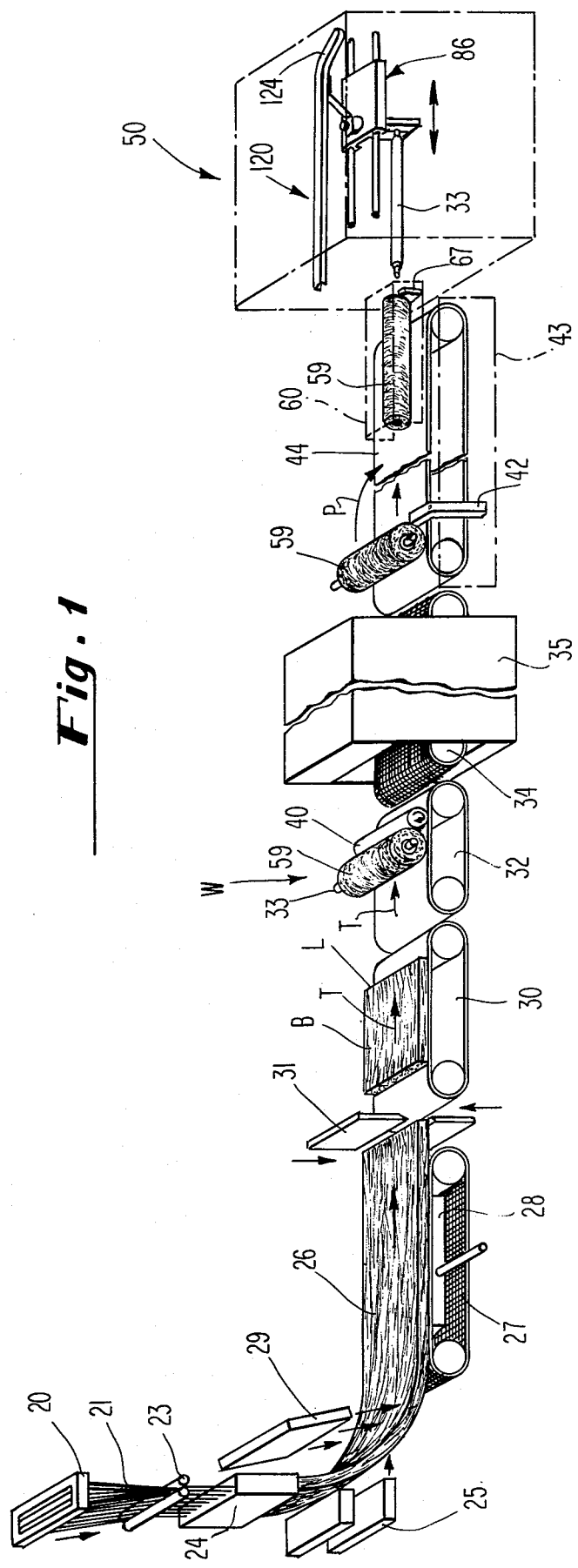
FIG. 1 is an oblique view of a typical tubular article production line constructed in accordance with the present invention.

Referring to the drawings and initially to FIG. 1, this figure illustrates a typical continuous apparatus embodying the features of the invention. Molten glass is fed through a bushing 20 to form downwardly moving primary fibers 21. The primary fibers may be drawn uniformly by means of powered roller 23 which brings the primaries into a substantially planar relationship and feeds them through guide 24. A hot gaseous blast is delivered by blast throat 25 transversely against the primaries to form them into fine microfibers which are directed towards and deposited in mat form as at 26 on the foraminous conveyor 27. A suction box 28 is provided beneath the upper flight of conveyor 27 to assist in obtaining proper deposit of the fibers on the conveyor. During the transition from the blast area to the conveyor a heat reactive binder, preferably a thermo setting resin, is intermixed with the fibers being delivered, through distributing head 29.

The matted mixture of fibers and resin is delivered from the end of conveyor 27 to a pick up conveyor 30 where a shear 31 is utilized to cut the mat into blanks or sheets B of proper length for the subsequent wrapping operation. This conveyor is driven at a greater speed than the forming conveyor in order to effect separation between successive sheets.

From the pick up conveyor the sheets are successively transferred to the input end of a still faster moving conveyor 32 which is part of the wrapping and forming machine W. This belt serves to advance the sheets B towards and into contact with wrapping mandrel 33. Conventional drives are provided for all of the conveyors, for example, an electric motor (not shown), connected with drive rollers and supporting rollers.

Several methods may be employed to begin the wrapping of sheet B on mandrel 33. One such method is to manually start the wrapping function of the mandrel around the sheet by engaging the leading edge of the sheet L with the rotating mandrel. Another and more automated method is to guide the sheet up behind the counterclockwise rotating mandrel and between the mandrel and a spring loaded upper compression roller 40 which rotates in a direction opposite to that of the mandrel, i.e. clockwise, so as to initiate the wrapping of the sheet of material around the mandrel. Both the mandrel and the compression roller are supported and driven by a conventional power source (not shown).

Once sheet B has been entirely wrapped on mandrel 33, a cylindrical mold, not shown, may be placed on the outer surface of the tubular article to conform the outer dimensions of the article to a particular design or size. This again can be done automatically or manually. After the mandrel has been wrapped and the tubular article 59 has been formed it then proceeds by means of conveyor 34 into and through a curing oven 35. The function of the oven is to cure the binder thereby forming the tubular article into its desired shape on the mandrel.

The tubular article from the time it has been wrapped and formed on the mandrel until after it has been cured in the oven is positioned transverse to the direction of movement of the conveyor see arrow T in FIG. 1. In order to change the position of the tubular article from its first position, i.e., where the axis of the tubular article is transverse to the direction of movement of the conveyor, to a second position where the axis is parallel to the direction of movement of the conveyor a stationary pivot arm 42 is provided which is mounted to the frame 64 of conveyor 44. This pivot arm contacts one end of the tubular article as it moves along the conveyor thereby pivoting the other end of the tubular article approximately 90° around the one end, as indicated by arrow P in FIG. 1, so as to rearrange the position of the article on the conveyor.

The tubular article consisting of a mandrel wrapped with a fiberglass mat continues on conveyor 44 in its second position, as indicated in FIG. 1 until it reaches the automatic mandrel pulling apparatus 50.

Figure 2:
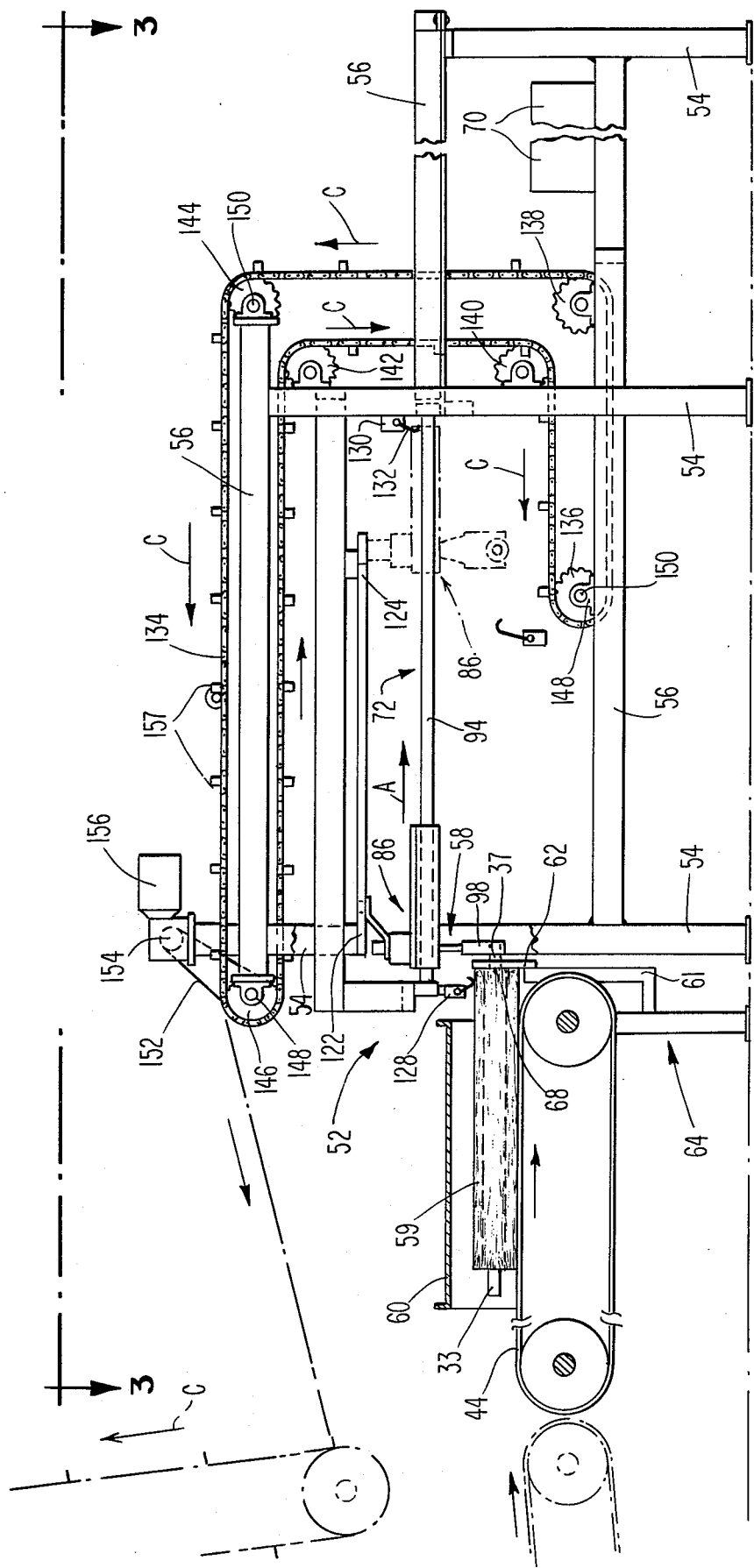
FIG. 2 is an enlarged elevational view, partially in section, of the apparatus for automatically removing a mandrel from a tubular article.

Referring to FIG. 2, tubular article 59 continues on conveyor 44, in its second position, until it enters a shuttle box 60 positioned on and mounted to the frame 64 of conveyor 44. This shuttle box operates to guide and align the tubular article towards and into the automatic mandrel pulling apparatus 50. As the tubular article, and specifically the mandrel 33 of the tubular article, proceeds through the shuttle box 60, it (mandrel 33) is directed into stripper plate 62 rigidly mounted, by welding or the like, to the frame of conveyor 44 by an upstanding "L" shaped leg member 61. As best illustrated in FIG. 4, stripper plate 62 has a generally "U" shaped opening 66 positioned therethrough adapted to permit the leading end 37 of mandrel 33 to extend forwardly through and beyond the front face 67 while the material wrapped around the mandrel abuts against the rear face 68 of the stripper plate thereby stopping the movement of tubular article 59 on conveyor 44.

Positioned adjacent stripper plate 62 is the automatic mandrel pulling apparatus 50. As shown in FIG. 2, this apparatus consists of frame generally designated as 52 which consists of vertical supports or legs 54 interconnected together by horizontal connecting members or channels 56. The forward or front end of the mandrel pulling apparatus will hereinafter refer to that portion adjacent conveyor 44 and the rear end will refer to the portion positioned furtherest from the front end.

Figure 3:
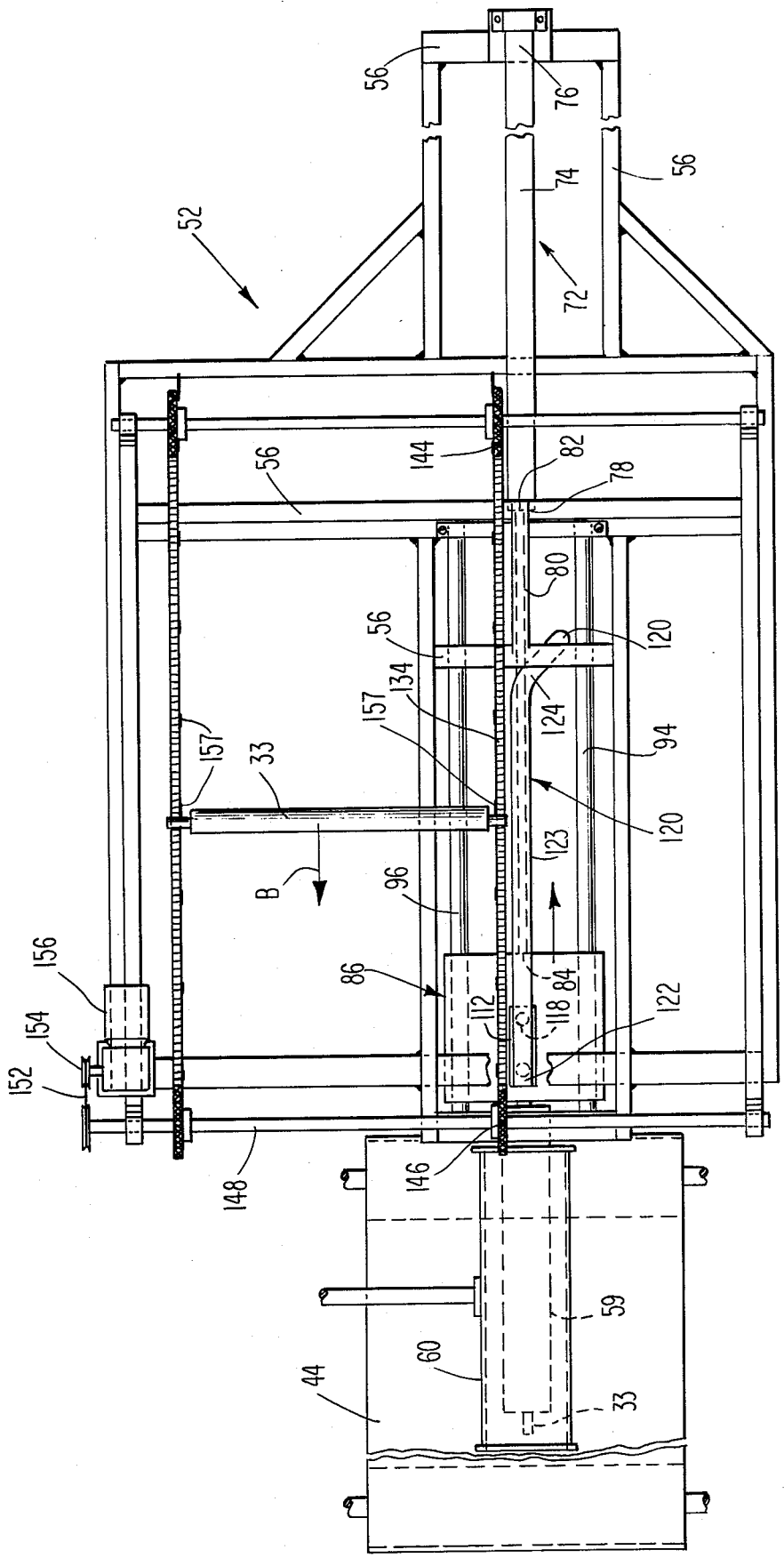
FIG. 3 is a view taken generally along lines 3—3 of FIG. 2.

Mounted to frame 52 is a hydraulic pumping unit 70 of a conventional type which is connected to and operates hyraulic cylinder 72. As illustrated in FIGS. 2 and 3, hydraulic cylinder 72 has a barrel or cylinder portion 74 having one end 76 mounted to a horizontal connecting member 56 of the mandrel pulling apparatus frame and the other or forward end 78 of the barrel also mounted to and supported by one of the horizontal connecting members 56 of the frame 52. The mounting herein above referred to is accomplished by brackets secured to members 56 by either welding or by nuts and bolts. The piston portion 80 of the hydraulic cylinder has one end 82 in cooperative association with barrel 74 while its other end 84 is mounted, by nuts and bolts or the like, to the pulling head assembly 86 of the automatic mandrel pulling apparatus.

Figure 4:
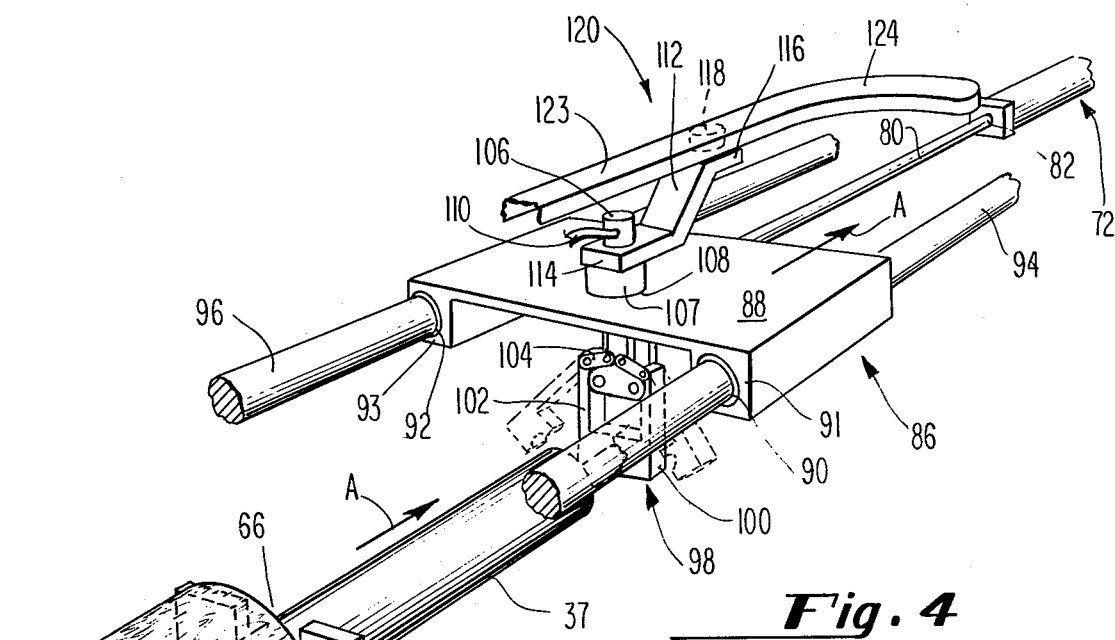
FIG. 4 is an enlarged view of the mandrel gripping and pulling assembly in which a mandrel in a first position is being removed from the tubular article.
Figure 5:
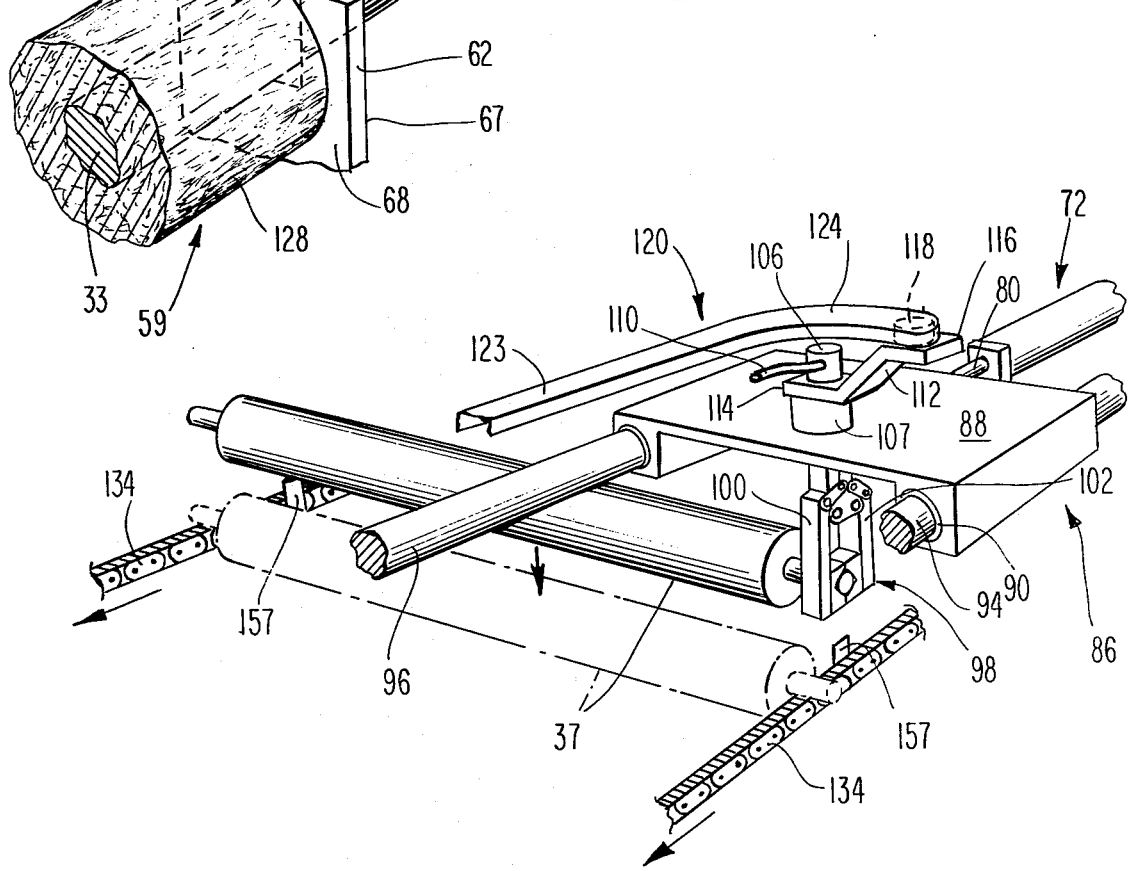
FIG. 5 is an enlarged view of the mandrel gripping and pulling assembly at a position in which the mandrel has been indexed to a second position.

As best shown in FIGS. 4 and 5, the pulling head assembly 86 consists of a head assembly support 88 which has a generally channel-like or "U" shape. This support contains bores 90 and 92 positioned in the downward projections 91 and 93 of the channel. Guide shafts 94 and 96 are horizontally mounted to frame 52 as indicated in FIG. 3 by suitable connectors or by welding or the like. These guide shafts pass through bores 90 and 92 to guide assembly 86 as it proceeds horizontally through the pulling machine 50.

Referring again to FIGS. 4 and 5, the pulling head assembly 86 contains gripper jaws 98. These jaws consist of two right angle members 100 and 102 which are pivotally connected to each other so as to be operably interconnected by toggle clamps 104. The horizontal portions of right angle members 100 and 102 are formed so as to receive and grip end 37 of mandrel 33 as it protrudes through stripper plate 62.

Toggle clamp 104 is supported and journaled for rotational movement in pulling head assembly 86 by an air swivel type fitting 107, the end of which has a generally cylindrical shape which passes through opening 108 in support 88 of the pulling head assembly. This fitting is adapted to rotate in opening 108 and control the operation of toggle clamp 104, i.e. the opening and closing of jaws 98. The air swivel type fitting has connected to it a flexible conduit 110 having one end connected to the fitting and another end connected to a typical air supply, not shown.

Pivot arm 112 has a generally "S"-like shape with one end 114 rigidly mounted to the air swivel fitting and its other end 116 extending in the same vertical plane but in an elevated horizontal plane from end 114. End 116 of pivot arm 112 has mounted thereto a cam follower 118. This cam follower has a generally disc-like shape and has one (its bottom most) end rigidly secured to the end 116 of the pivot arm. It should be noted that swivel fitting 106 is adapted to rotate freely within opening 108 in the head support 88.

Cam track 120, having a generally "J"-like shape, as illustrated in plan view 3 and prospective views 4 and 5, is horizontally disposed above pulling head assembly 86 within mandrel pulling apparatus 50. Its forward most end 122 is rigidly mounted to a vertical support 54 and its arcuate shaped end 124 mounted to one of the rearwardly positioned horizontal connecting members 56, by welding or the like. Cam track 120 has a generally channel-like configuration to receive and retain cam follower 118 therein.

As shown in FIGS. 3, 4, and 5, when the pulling head assembly 86 moves in a horizontal rearward direction along guide shafts 94 and 96, as indicated by arrow A in FIG. 4, the pivot arm and the associate cam follower 118, which interconnect the pulling head assembly to the cam track, move in a generally straight line position until such time as the cam follower enters the arcuate shaped portion 124 of cam track 120. At this time, the cam follower continues to proceed within the cam track but in an arcuate path until such time as the rearward motion, as indicated by arrow A ceases and the pivot arm and the cam follower come to a position as indicated in FIG. 5.

As shown in FIGS. 4 and 5, as the cam follower proceeds through the arcuate shaped end 124 of the cam tract the pivot arm moves in a clockwise direction thereby pivoting or indexing the air swivel fittings and the associated toggle clamps approximately 90°, i.e., to the first position in which the axis of the mandrel is perpendicular to the axial movement of the mandrel through the mandrel pulling apparatus.

Referring specifically to FIG. 2, there is shown a mandrel sensing switch 128 positioned adjacent face 68 of the stripper plate and mounted to frame 52 of the automatic mandrel pulling apparatus. This electrical sensing switch is positioned so as to contact the outer most portion of the wrapped tubular article immediately prior to movement into the stripper plates. FIG. 2 indicates the activated or engaged position of the mandrel switching switch as it contacts the outer most periphery of the wrapped tubular article. This sensing switch is electrically connected in series so that the automatic mandrel pulling machine will be inoperative unless the sensing switch is in the engaged or activated position.

As indicated in FIGS. 2, 3, and 4, the normal or at rest portion of the mandrel pulling machine is such that the piston 80 of cylinder 72 is extended thereby placing the pulling head assembly and the gripper jaws associated therewith adjacent "U" shaped opening 66 of the stripper plate. The gripper jaws of the pulling head assembly are in a disengaged or opened position as indicated in phantom lines in FIG. 4, until such time as the mandrel sensing switch senses the presence of a wrapped tubular article. At this time, the sensing switch automatically signals the air supply thereby activating gripper jaws 98 causing the jaws to engage the forward most end 37 of the mandrel. The mandrel sensing switches 128 through a conventional time delayed circuit also automatically signals the hydraulic pumping unit 70 to start moving the piston portion 80 of the cylinder 72, in direction A, or away from stripper plate 62, as indicated in FIGS. 2 and 4. As the piston is retracted into barrel portion 74, the mandrel is moved horizontally and rearwardly along guide shafts 94 and 96 axially out of and through the fiberglass which was wrapped around the mandrel. As shown in FIG. 4, the wrapped or rolled fiberglass 128 remains abutted against face 68 of the stripper plate as the mandrel is pulled through and out of the roll of fiberglass.

As previously stated, the swivel fitting of the pulling head assembly remains essentially stationary until such time as the mandrel is completely removed from the fiberglass wrapping. After the mandrel has been removed, the cam follower then proceeds through the arcuate shaped end 124 of the cam track. This movement, through portion 124 of the cam track causes the air swivel fitting to rotate in a clockwise direction approximately 90° thereby rotating and indexing the gripper jaws of the pulling head assembly and the mandrel clockwise 90° to a position indicated in FIG. 5, i.e. to its first position. When the gripper jaws and the mandrel have moved through end 124 of the cam track, the pulling head assembly 86 contacts a limit switch 130. As shown in FIG. 2, this limit switch 130, is mounted to a vertical leg or support 54 of frame 52 of the mandrel pulling apparatus and has an engagement finger 132 which extends downwardly so as to contact and engage the pulling head assembly as it reaches its full retracted position.

This limit switch is connected to the air supply to cease the flow of air to the air toggle clamps thereby disengaging gripper jaws 98 and releasing them to their normally expanded position. When the jaws are disengaged the mandrel drops, as shown in FIG. 5, onto a return chain 134. The limit switch 130 also is adapted to send a signal through a conventional time delay circuit to the hydraulic pumping unit to reverse the flow in cylinder 72 causing the piston of the hyraulic cylinder to be extended in direction B, as indicated in FIG. 3, thereby returning the pulling head assembly to its forward most position adjacent the stripper plate 62.

When the mandrel is released by gripper jaws 98 it falls onto return chain 134 which is supported and driven by sprockets 136, 138, 140, 142, 144, and 146. These sprockets are rotatably mounted to frame 52 of the mandrel pulling apparatus by clevis 148 which receive the respective shafts 150 of the sprockets.

Sprocket 146 is connected by chain 152 to drive sprocket 154 which is driven by a conventional power source 156, e.g., electric motor or the like. Mounted to and extending outwardly from return chain 134 are a plurality of spaced stops or lugs 157 which act to retain the mandrel on the return chain as it rotates, in a direction indicated by arrow C in FIG. 2, through and out of the mandrel pulling apparatus to a storage area.

Figure 6:
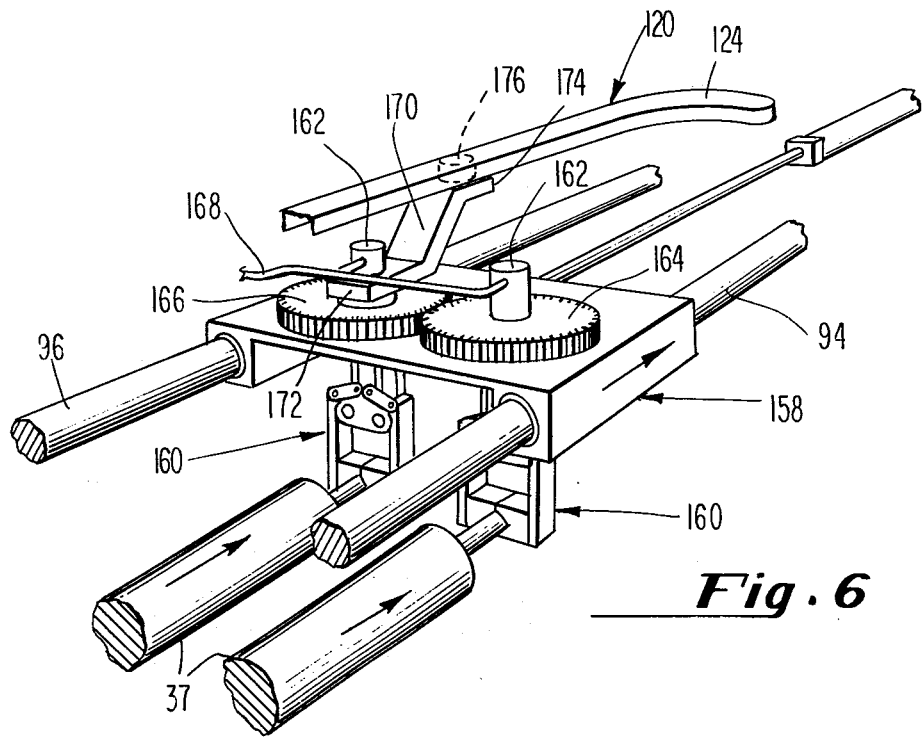
FIG. 6 is an enlarged view of an alternative embodiment of the mandrel gripping and pulling assembly in which the mandrels in their first position are being removed from the tubular article.
Figure 7:
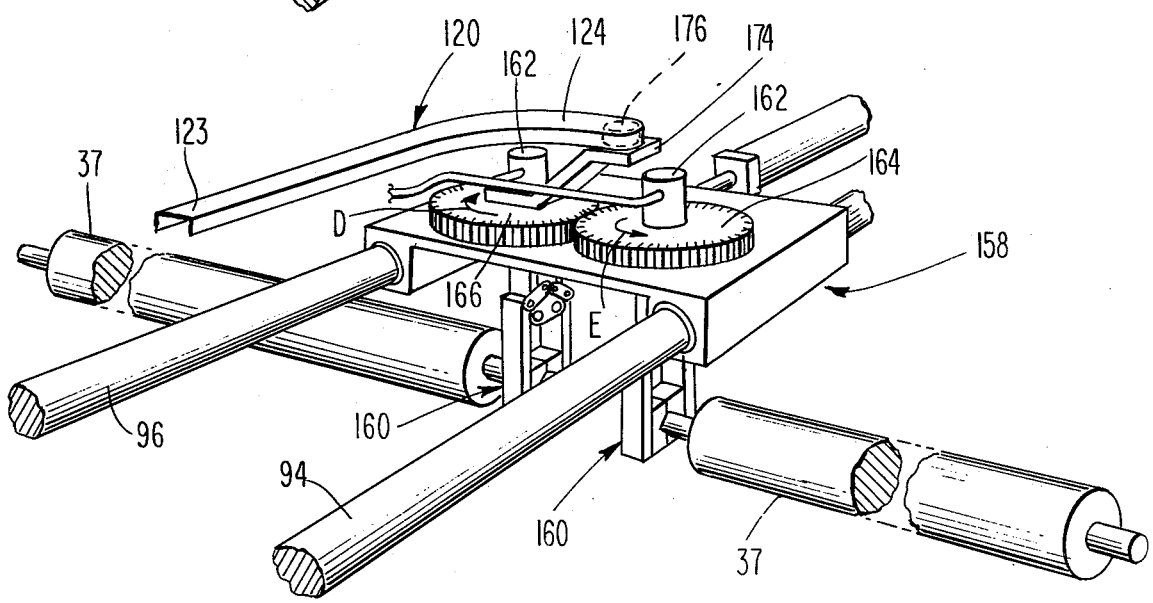
FIG. 7 is an enlarged view of an alternative embodiment of the mandrel gripping and pulling assembly at a position in which the mandrels have been automatically indexed to their second position.

FIGS. 6 and 7 set forth an alternative embodiment of the present invention in which a pair of mandrels may be simultaneously and automatically removed from a wrapper tubular article containing a mandrel.

The pulling head assembly 158 is essentially similar to previously described and explained pulling head assembly 86. However, pulling head assembly 158 contains a pair of gripper jaws 160 identical in construction and operation to gripper jaws 98 and positioned adjacent each other. The pulling head assembly 158 contains a pair of gears 164 and 166 each of which are mounted to respective air swivel fittings 162. Flexible conduits 168, similar to those previously described, have one end connected to a suitable air supply and another end connected to the air swivel fittings.

A pivot arm 170, of similar construction to pivot arm 112, hereinabove described, has one end 172 rigidly mounted to one of the air swivel fittings 162 and another end 174 containing a disc shaped cam follower 176. This cam follower proceeds in cam track 120 having straight section 123 and an arcuate shaped end 124 as previously described. As the cam follower 176 proceeds through the arcuate shaped portion of cam track 120 the pivot arm 170 rotates in a clockwise direction which causes a simultaneous and identical clockwise movement in gear 166 as indicated by arrow D in FIG. 7. As gear 166 rotates through 90° there is generated a simultaneous and equal 90° counterclockwise rotation as indicated by arrow E in gear 164. The clockwise and counterclockwise movement of the respective gears 166 and 164 cause the gripper jaws 160 to pivot 90° in opposite directions from each other to position and index the mandrels into their first position, i.e., axis perpendicular to axial movement through the mandrel pulling machine. Limit switches identical to those described, are included to control the operation of both the jaws 160 and cylinder 72. Therefore, this type of construction of the pulling head assembly 158 enables a pair of mandrels to be simultaneously removed from wrapped tubular articles of the type described hereinabove.

While the preferred structure in which the principles of the present invention have been incorporated is shown and described and above, it is to be understood that the invention is not to be limited to the particular details, shown and described above, but that, in fact, widely different means may be employed in the practice of the broader aspects of the invention.

I claim:

1. An apparatus for automatically removing a mandrel from a tubular article comprising:
   a. a frame;

b. a conveyor for transporting the tubular article with the mandrel therein to the frame;
c. means associated with the conveyor for positioning the tubular article into a second position from a first position;
d. means associated with said frame for stopping said tubular article on said conveyor;
e. means operably associated with the stopping means for gripping and moving said mandrel axially out of and away from said tubular article.
f. means operably associated with the gripping and moving means for automatically indexing said mandrel to the first postion, and
g. means operably associated with said gripping and moving means for automatically controlling the gripping and moving means so as to automatically grip and move said mandrel from said tubular article when said tubular article is stopped on said conveyor and automatically releasing said mandrel after said mandrel has been indexed to said first position.

2. An apparatus as recited in claim 1 wherein said gripping and moving means comprises:
a. a movable support;
b. means for guiding the support;
c. means operable associated with said support for moving said support both towards said stopping means to a position adjacent said stopping means and away from said stopping means, and
d. means rotatably mounted to said support, to engage said mandrel when said support is positioned adjacent said stopping means and retain said mandrel until said mandrel has been moved away from said tubular article and indexed to said first position.

3. An apparatus as recited in claim 2 wherein the means for automatically indexing said mandrel comprises:
a. a track mounted to said frame, and
b. means for interconnecting said engaging and retaining means to the track, the interconnecting means having one end movably mounted to said track and an other end rigidly affixed to said engaging and retaining means such that movement of the one end causes a rotational movement of the other end.

4. An apparatus as recited in claim 2 wherein said moving means comprises, at least one hydraulic cylinder having both a rod and cylinder portion, the rod portion being mounted to said support and the cylinder portion being mounted to said frame so that movement of said rod will impart a similar movement to said support.

5. An apparatus as recited in claim 4 wherein said guiding means comprises at least one guide shaft mounted to said frame and extending through said support for guiding the movement of said support.

6. An apparatus as recited in claim 5 wherein said support has a U-shape.

7. An apparatus as recited in claim 6 wherein the engaging and retaining means includes a clamp adapted to engage and retain said mandrel.

8. An apparatus as recited in claim 7 wherein said rod portion of said cylinder when fully extended positions the clamp adjacent said stopping means.

9. An apparatus for automatically removing a mandrel from tubular articles comprising:
a. a frame;
b. a conveyor for transporting the tubular articles with the mandrel therein to the frame;
c. means operably associated with the conveyor for positioning the tubular article into a second position parallel to the movement of said conveyor from a first position normal to the movement of said conveyor;
d. a stripper plate mounted to said frame for stopping said tubular article on said conveyor the plate adapted to permit an end of said mandrel to extend through the plate;
e. means operably associated with said plate for gripping the end of said mandrel and moving said mandrel axially out of and away from said tubular article;
f. means operably associated with the gripping and moving means for automatically indexing said mandrel to said first postion after said mandrel has been moved away from said tubular articles;
g. means operably associated with said gripping and moving means for automatically controlling the gripping and moving means so as to automatically grip and move said mandrel away from said tubular article when said tubular article is stopped on said conveyor and automatically releasing said mandrel after said mandrel has been indexed to said first position, and
h. means for receiving and conveying said released mandrel to a storage area.

10. An apparatus for automatically removing mandrels from a pair of tubular articles comprising:
a. a frame;
b. a conveyor for transporting the pair of tubular articles with the mandrel therein to the frame, the mandrels of said pair of tubular articles being positioned normal to the movement of the conveyor;
c. means associated with said conveyor for positioning said pair of tubular articles into a second position parallel to the movement of said conveyor from a first position normal to the movement of said conveyor;
d. means associated with said frame for stopping said tubular articles on said conveyor;
e. means operably associated with the stopping means for gripping and moving the mandrels axially out of and away from said pair of tubular articles;
f. means operably associated with the gripping and moving means for automatically and simultaneously indexing said mandrels to the first position;
g. means operably associated with said gripping and moving means for automatically controlling said gripping and moving means so as to automatically grip and move said mandrels away from said tubular article when said tubular article is stopped on said conveyor and automatically and simultaneously release said mandrels after said mandrels have been indexed to said first position, and
h. means for receiving and conveying released mandrels to a storage area.

11. An apparatus as recited in claim 10 wherein said gripping and moving means comprises;
a. a movable support;
b. means for guiding the support;
c. at least one hydraulic cylinder having both rod and cylinder portions the cylinder portion being mounted to said frame and the rod portion being mounted to said support, the hydraulic cylinder being adapted to move said support both towards said stopping means to a position adjacent said stopping means and axially away from said stopping means; and d. a pair of clamps rotatably mounted to said support and adapted to both engage said mandrels when said support is positioned adjacent said stopping means and retain said mandrels until said mandrels have been moved away from said tubular article and indexed to said first position.

12. An apparatus as recited in claim 11 wherein said means for automatically and simultaneously indexing said mandrels comprises;

a. at least one guide track mounted to said frame, the track having a first linear section and a second curved section;

b. means for interconnecting said track and one of said pair of clamps, the interconnecting means having one end movably mounted on said track and another end mounted to one of said pair of clamps whereby movement of the one end will impart a rotational movement to the other end, and c. means operably associated with said clamps for imparting simultaneous equal and opposite movement to said clamps.

13. An apparatus as recited in claim 12 wherein said means for imparting simultaneous, equal and opposite movement to said pair of clamps comprises, a pair of identical meshing gears one of the gears being mounted to the one of said pair of clamps, the other gear being mounted to the other of said pair of clamps such that rotation of the one of said pair of clamps will rotate said one gear in the same direction as said one of said pair of clamps while rotating said other gear and said other of said pair of clamps in an equal and opposite direction to the same direction.

* * * * *

UNITED STATES PATENT OFFICE
CERTIFICATE OF CORRECTION

Patent No. 4,080,142   Dated March 21, 1978

Inventor(s) Michael O. Moore

It is certified that error appears in the above-identified patent and that said Letters Patent are hereby corrected as shown below:

Column 1, Line 46 delete "a method and" and insert --an--

Column 6, Line 21 "wrapper" should be --wrapped--

Signed and Sealed this

Twenty-fifth Day of July 1978

[SEAL]

Attest:

RUTH C. MASON
*Attesting Officer*

DONALD W. BANNER
*Commissioner of Patents and Trademarks*